United States Patent
Bazawada et al.

(10) Patent No.: US 9,721,475 B2
(45) Date of Patent: Aug. 1, 2017

(54) SYSTEMS AND METHODS FOR DISPLAYING OBJECT AND/OR APPROACHING VEHICLE DATA WITHIN AN AIRPORT MOVING MAP

(71) Applicant: HONEYWELL INTERNATIONAL INC., Morristown, NJ (US)

(72) Inventors: Suresh Bazawada, Karnataka (IN); Anil Kumar Songa, Karnataka (IN); Mahesh Babu N, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/478,100

(22) Filed: Sep. 5, 2014

(65) Prior Publication Data

US 2016/0071422 A1 Mar. 10, 2016

(51) Int. Cl.
 *G08G 5/00* (2006.01)
 *G08G 5/06* (2006.01)
 *G01C 23/00* (2006.01)

(52) U.S. Cl.
 CPC ............. *G08G 5/065* (2013.01); *G01C 23/00* (2013.01); *G08G 5/003* (2013.01); *G08G 5/0021* (2013.01); *G08G 5/0073* (2013.01); *G08G 5/0078* (2013.01); *G08G 5/0086* (2013.01)

(58) Field of Classification Search
 CPC .............................. G08G 5/0021; G08G 5/003
 USPC .......................................................... 701/439
 See application file for complete search history.

(56) References Cited

U.S. PATENT DOCUMENTS

| 6,028,624 | A | * | 2/2000 | Watkins | B64D 47/04 348/117 |
| 7,908,082 | B2 | | 3/2011 | Clark et al. | |
| 9,047,771 | B1 | * | 6/2015 | Thoreen | G08G 5/065 |
| 9,142,133 | B2 | * | 9/2015 | Palanisamy | G08G 5/0021 |

(Continued)

FOREIGN PATENT DOCUMENTS

| EP | 2431960 A2 | 3/2012 |
| EP | 2669706 A2 | 12/2013 |
| WO | 2014033354 A1 | 3/2014 |

OTHER PUBLICATIONS

He, G. et al.; EGPWS on Synthetic Vision Primary Flight Display; Enhanced and Synthetic Vision 2007, Proc. of SPIE vol. 6559, 655904, (2007)—0277-786X/07:10.1117/12.719554 Proc. of SPIE vol. 6559 655904-1; Downloaded From: http://proceedings.spiedigitallibrary.org/ on Jun. 19, 2014 Terms of Use: http://spiedl.org/terms.

(Continued)

*Primary Examiner* — Yazan Soofi
(74) *Attorney, Agent, or Firm* — Lorenz & Kopf, LLP (57) ABSTRACT

Systems and methods for displaying object data within an airport moving map ("AMM") are disclosed. In various embodiments, the systems may comprise an avionics database, a flight management system comprising a processor communicatively coupled to the avionics database, and/or a display communicatively coupled to the processor, the processor configured to receive AMM data from the avionics database, receive object data, and/or display the AMM, the AMM including an image of the object, the AMM further including an image of an area that may be obscured from a field of view of a pilot by the object.

16 Claims, 8 Drawing Sheets

(56) References Cited

U.S. PATENT DOCUMENTS

| | | | | |
|---|---|---|---|---|
| 2008/0231473 A1* | 9/2008 | Wyatt | ................... | G01C 23/00 340/971 |
| 2013/0166189 A1* | 6/2013 | Michel | .................. | G08G 5/065 701/120 |
| 2013/0325312 A1 | 12/2013 | Khatwa et al. | | |
| 2014/0019005 A1* | 1/2014 | Lee | ....................... | G08G 1/166 701/36 |
| 2014/0062756 A1* | 3/2014 | Lamkin | ............... | G08G 5/0021 342/29 |
| 2015/0106005 A1* | 4/2015 | Wischmeyer | ......... | G08G 5/065 701/301 |
| 2015/0154874 A1* | 6/2015 | Murthy | ................... | G08G 5/06 701/120 |

OTHER PUBLICATIONS

EP Extended Search Report for Application No. EP 15182241.8 Dated Feb. 12, 2016.
EP Examination Report for Application No. EP 15 182 241.8-1803 dated Oct. 4, 2017.

* cited by examiner

SYSTEMS AND METHODS FOR DISPLAYING OBJECT AND/OR APPROACHING VEHICLE DATA WITHIN AN AIRPORT MOVING MAP

TECHNICAL FIELD

The present invention generally relates to displaying object or obstacle and/or approaching vehicle data within an airport moving map ("AMM"), and more particularly relates to displaying object or obstacle and/or approaching vehicle data that are not in a field of view of an aircraft pilot.

BACKGROUND

An airport moving map is a map displayed for a pilot of an aircraft. An AMM may include a variety of objects, such as obstacles, taxiways, and the like. In addition, an AMM may be displayed in two dimensions as well as three dimensions. An AMM may, in either of a two dimensional display or a three dimensional display, include an indication of a field of view of a pilot. In a conventional two-dimensional AMM, the field of view of the pilot may be represented by two indices extending from an icon representing the aircraft being piloted and may terminate at a distance from the aircraft in an arc. Thus, the displayed field of view may comprise a sector; that is, the shape generally enclosed between the arc and the two radially extending indices. The displayed field of view may be further defined, when the aircraft is piloted in the dark and reliant upon one or more lamps for illumination of the actual field of view, by a sector extending away from the aircraft to a distance generally illuminated by the lamps.

Typically, however, although the AMM may display one or more objects, the AMM may not define an area about the one or more displayed objects that may be obstructed by the one or more objects from the actual field of view of the pilot. Thus, although a conventional AMM may alert a pilot to an object in the path of the aircraft, the AMM may not display data about the dimensions (e.g., the distance that the object extends above the surface of the road surface) of the object and/or the area obstructed from view by the object. A pilot may therefore mistakenly conclude that the object does not obscure from the pilot's field of view an area about or behind the object.

In addition, conventional AMMs may not display an indication that a vehicle (e.g., another aircraft or other vehicle) is approaching the aircraft unless the oncoming vehicle (or "intruder") is within the displayed field of view. Thus, a pilot viewing a displayed field of view may not be alerted to such an event.

Hence, there is a need for an AMM that displays data about the dimensions of an area that may be obscured by an object that is within the field of view of the pilot and/or data about an intruder that is not within the field of view of the pilot.

BRIEF SUMMARY

Systems and methods for displaying object data within an airport moving map ("AMM") are disclosed. In various embodiments, the systems may comprise an avionics database, a flight management system comprising a processor communicatively coupled to the avionics database, and/or a display communicatively coupled to the processor, the processor configured to receive AMM data from the avionics database, receive object data, and/or display the AMM, the AMM including an image of the object, the AMM further including an image of an area that may be obscured from a field of view of a pilot by the object.

This summary is provided to describe select concepts in a simplified form that are further described in the Detailed Description. This summary is not intended to identify key or essential features of the claimed subject matter, nor is it intended to be used as an aid in determining the scope of the claimed subject matter.

Furthermore, other desirable features and characteristics of the systems and methods disclosed herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As described above, conventional AMMs may not display or indicate an area about one or more displayed objects. For example, although an AMM may typically display an object or obstacle, the AMM may not display or indicate that the obstacle may obscure from a pilot's field of view another object situated about (e.g., from the pilot's perspective, behind) the object. A pilot may therefore mistakenly conclude that the object does not obscure from the pilot's field of view such an area.

In addition, conventional AMMs may not display an indication that a vehicle (e.g., another aircraft or other vehicle) is approaching the aircraft unless the oncoming vehicle is within the displayed field of view of the AMM. Thus, a pilot viewing a displayed field of view in a conventional AMM may not be alerted to such an event.

Therefore, as described herein, and in various embodiments, a system for displaying obstacle and approaching vehicle data that are not in a field of view of an aircraft pilot is disclosed. The system may, in various embodiments, shade or otherwise indicate an area about an object that is and/or may be obscured from a field of view of a pilot. The system may further, in various embodiments, indicate that a vehicle outside the field of view of a pilot is approaching the aircraft. In some embodiments, this indication may be represented, on an AMM display within the aircraft, by a highlighted or otherwise differentiated radial index extending from an icon representing the aircraft.

Thus, the systems and methods disclosed herein can alert a pilot that an object in a field of view of the pilot may obscure another object that is not visible in the field of view of the pilot. These systems and methods may, in addition, alert a pilot that a vehicle that is not visible in the field of view of the pilot is approaching the aircraft of the pilot.

As used herein, a "field of view" (or "actual field of view") of a pilot may generally comprise a sector that a pilot is able to visually observe, from a cockpit window, from within a cockpit. Thus, as described above, a field of view may be generally defined by two radial indices extending away from the aircraft and terminating in and joined to each other at their terminuses by an arc. A field of view may thus generally comprise the shape enclosed between the arc and the two radial indices (or to simplify, a wedge shape).

In an AMM, a "field of view" (or "AMM field of view") of a pilot may be represented by a sector defined, as described above, by two radial indices extending away from an icon representing the aircraft and joined to each other at their terminuses by an arc. Thus, in an AMM, a field of view of the pilot may approximate the actual field of view of the pilot; that is, what the pilot is able to observe visually from a seated position within the cockpit of the aircraft.

Figure 1:
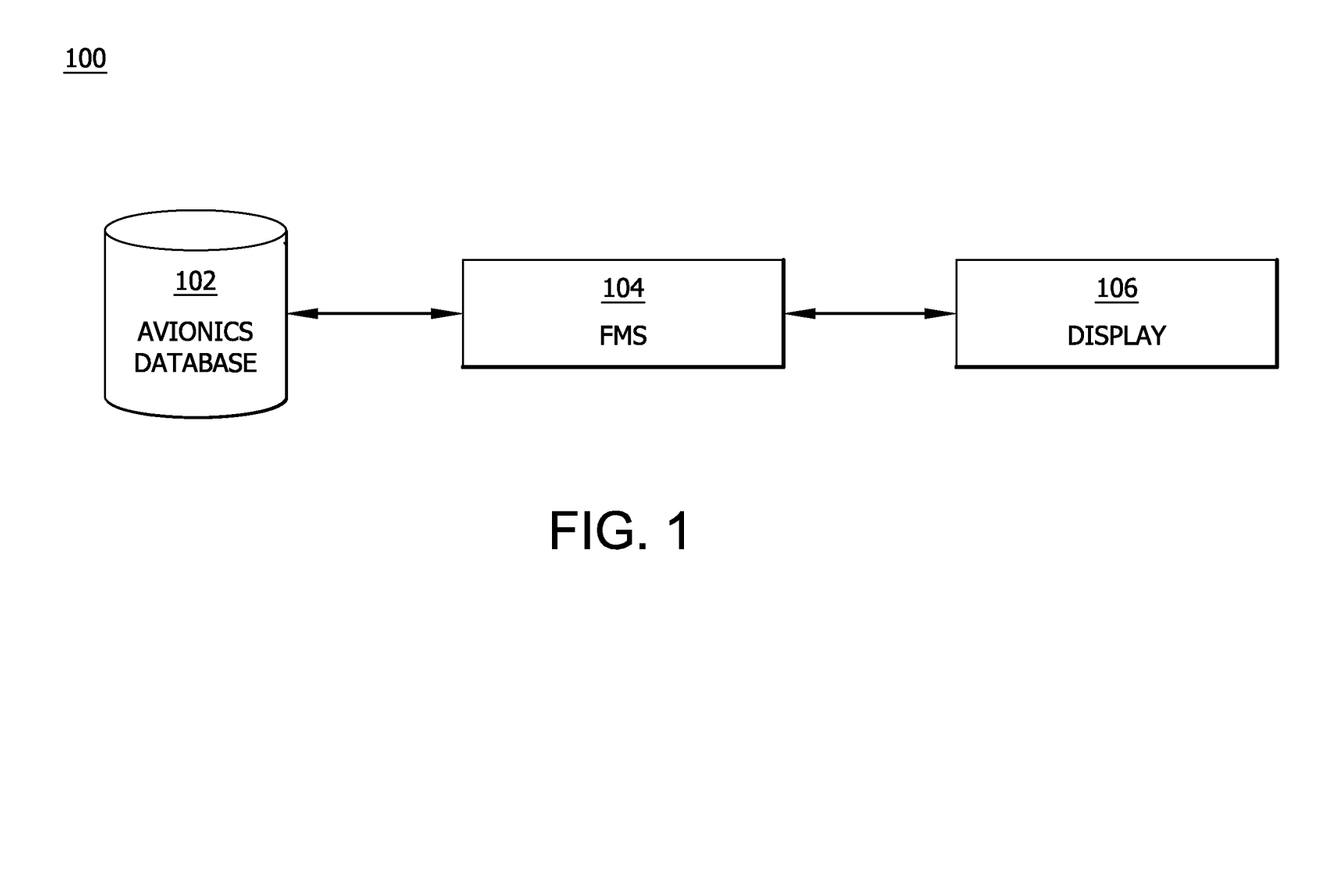
FIG. 1 illustrates, in accordance with various embodiments, a system for displaying obstacle and/or intruder data within an AMM.

With attention now to FIG. 1, a system 100 for displaying obstacle and approaching vehicle data that are not in a field of view of an aircraft pilot is shown. The system 100 can comprise an avionics database 102, a flight management system ("FMS") 104 comprising, in various embodiments, a computer processor or processors, and/or a display 108. The FMS 104 can be communicatively coupled to the avionics database 102 and/or the display 108.

Figure 2:
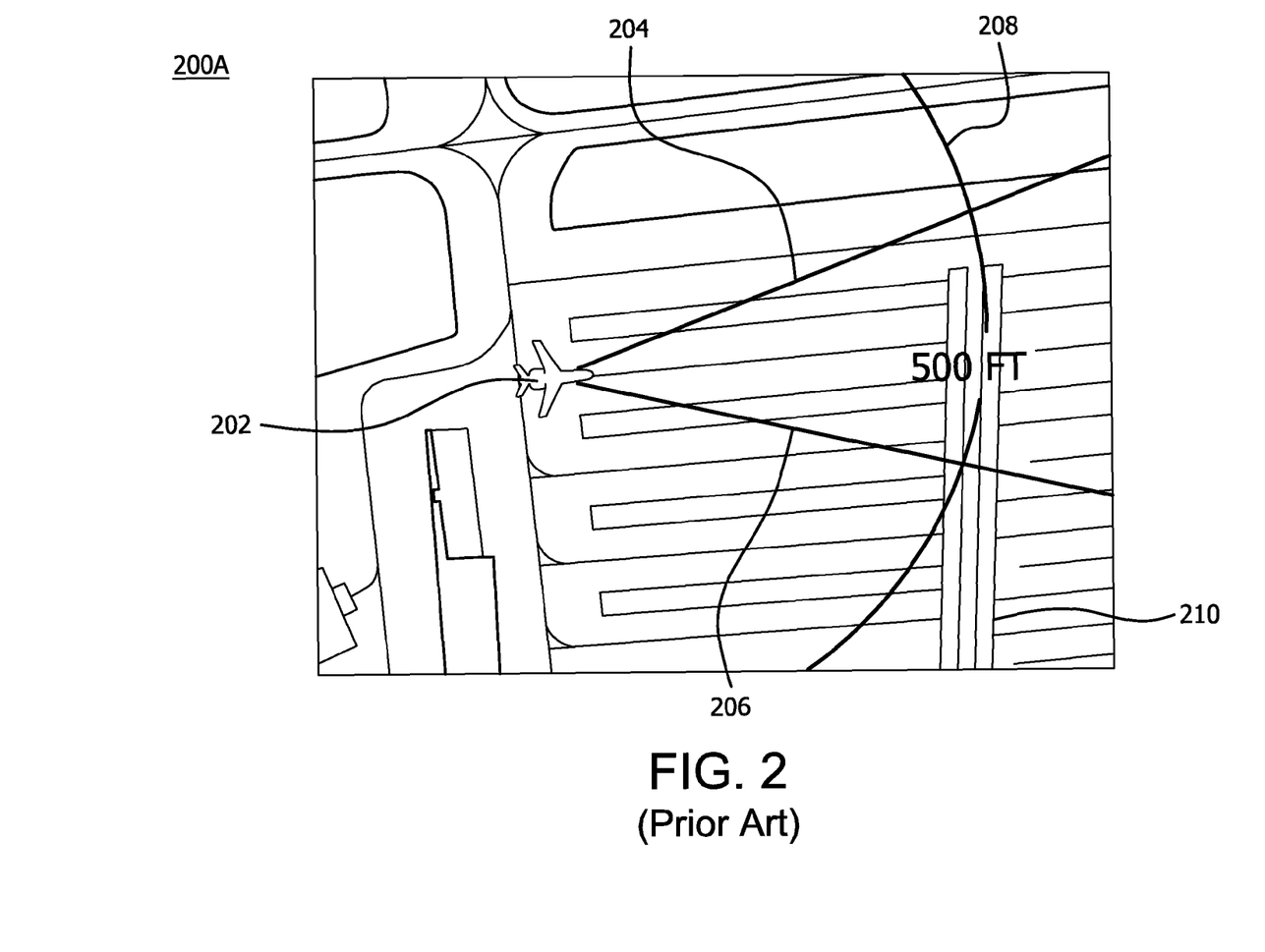
FIG. 2 illustrates a prior art example of an AMM displayed in two dimensions.
Figure 3A:
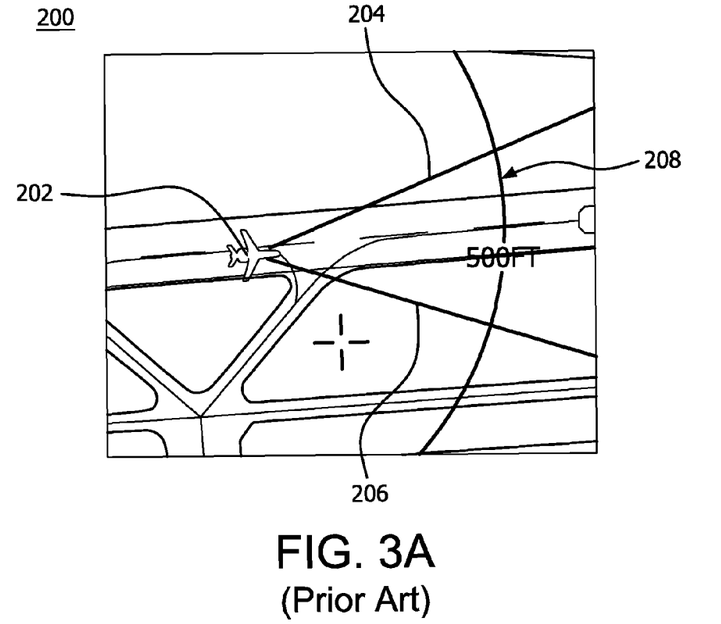
FIG. 3A illustrates a prior art example of an AMM displayed in two dimensions.
Figure 3B:
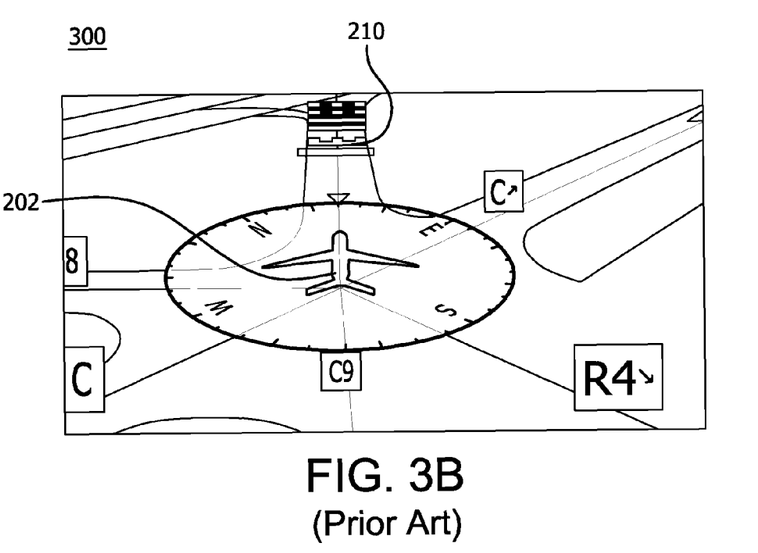
FIG. 3B illustrates a prior art example of an AMM displayed in three dimensions.
Figure 3C:
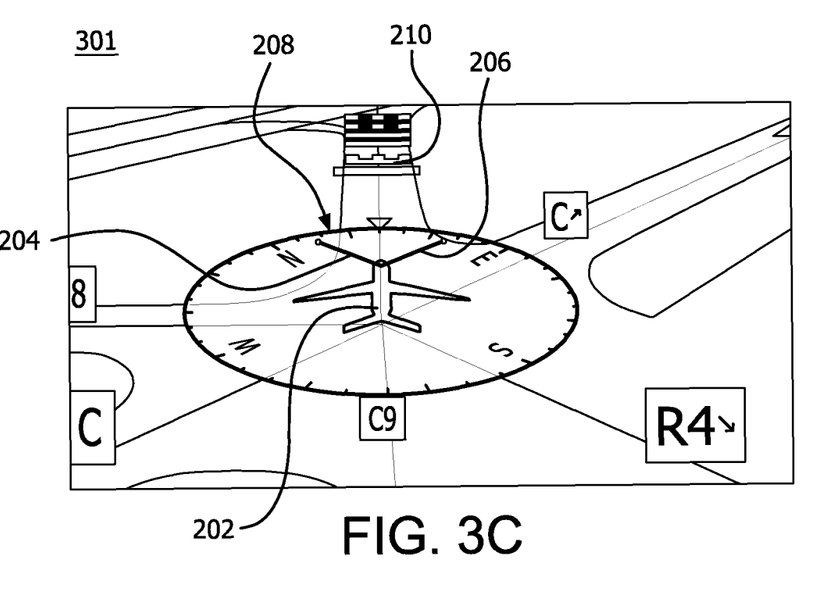
FIG. 3C illustrates, in accordance with various embodiments, an AMM displayed in three dimensions and including field of view lines.

With respect to the AMM displayed for a pilot by the display 108, FIGS. 2 and 3A illustrate a prior art AMM 200 provided in a two dimensional or top view, while FIG. 3B illustrates a prior art AMM 300 providing a three dimensional view. The prior art three dimensional AMM 300 may not display any field of view indices, as described herein. As shown at FIG. 3C, however, a three dimensional AMM 301, can, in various embodiments, comprise an icon 202 representing an aircraft, two radial indices 204 and 206 extending at angles away from the aircraft icon 202, and an arc 208 joining the two radially extending indices 204 and 206. Thus, the AMM field of view of the pilot can comprise, in various embodiments, and in any of a two dimensional or three dimensional representation, as described above, a sector that approximates an actual field of view of a pilot (as observed by the pilot from the cockpit).

In addition, and with continuing reference to FIG. 2, the AMM 200 may illustrate one or more structures or objects, such as object 210 that are within the field of view of the pilot. In the prior art, however, the AMM 200 may not display an area about the object 210 that may be obscured from the field of view of the pilot. Thus, the pilot may mistakenly conclude that the object 210 does not obscure the field of view of the pilot any further than the object 210 is displayed by the AMM 200. In addition, although the AMM 200 may display an area about the aircraft that is illuminated (or predictably illuminated) by one or more external operating illumination devices (e.g., lamps, headlights, and the like), the AMM 200 may fail to display additional object information.

Figure 4:
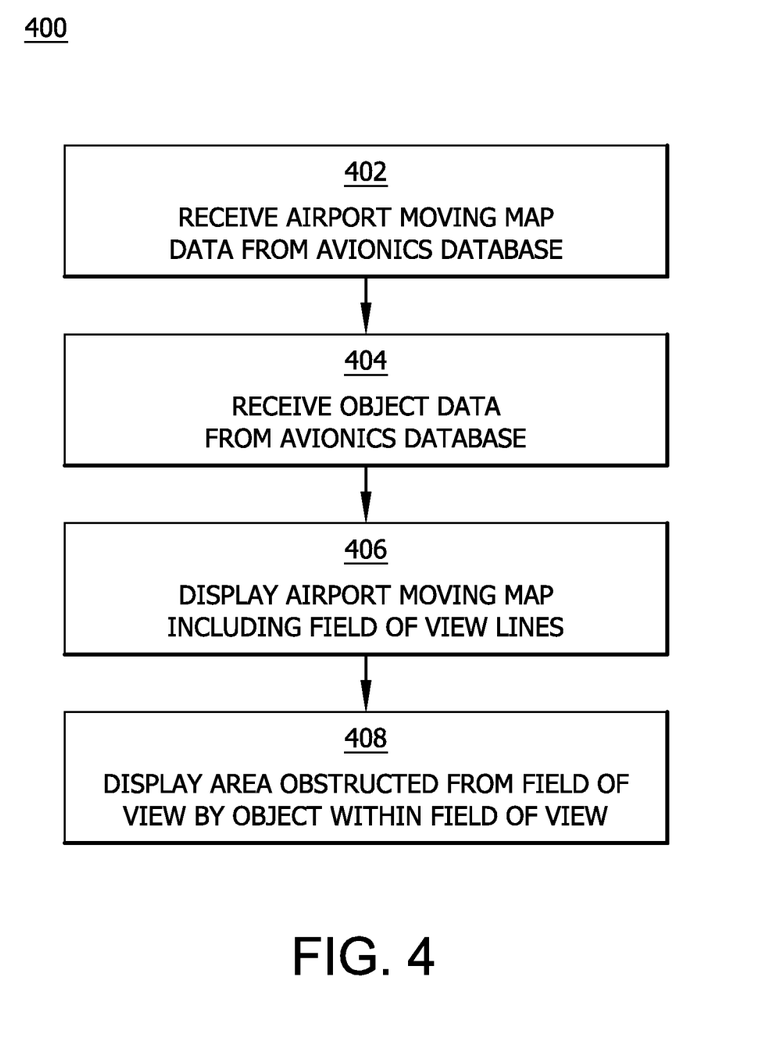
FIG. 4 illustrates, in accordance with various embodiments, a process for displaying obstacle data within an AMM.

FIG. 4 therefore shows an example process 400, associated with various embodiments, for alerting a pilot to an object 210 as well as an area that may be obscured and/or partially obscured by the object 210. In various embodiments, the FMS 104 can receive an AMM and/or AMM data from an avionics database 102 (step 402). The FMS 104 can, in addition, receive object data associated with an object 210 that is in the field of view of the pilot from a sensor and/or any other signal or indicator transmitted and/or received by the FMS 104 (step 604). The AMM can include a field of view of the pilot (step 406). In addition, the AMM can include the object data, as well as data about an area that may be obscured by the object 210 from the field of view of the pilot (step 408). The FMS 104 can, in response, process the AMM and/or object data to generate the AMM, including the object data and the area that may be obscured by the object 210. This AMM can be displayed by the display 106.

Figure 5A:
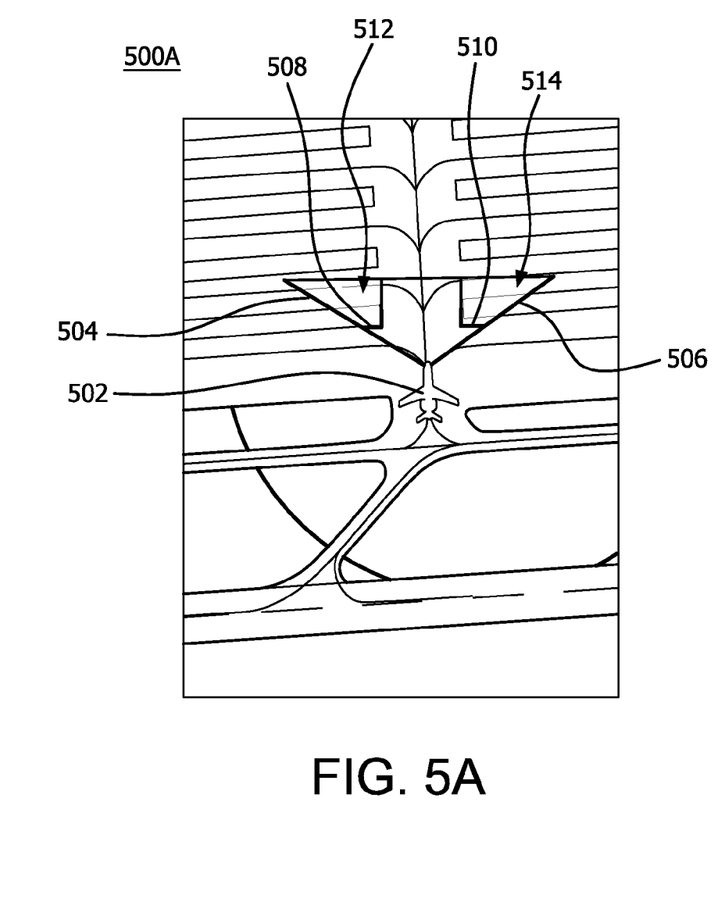
FIG. 5A illustrates, in accordance with various embodiments, an example of an AMM displaying object data in two dimensions.
Figure 5B:
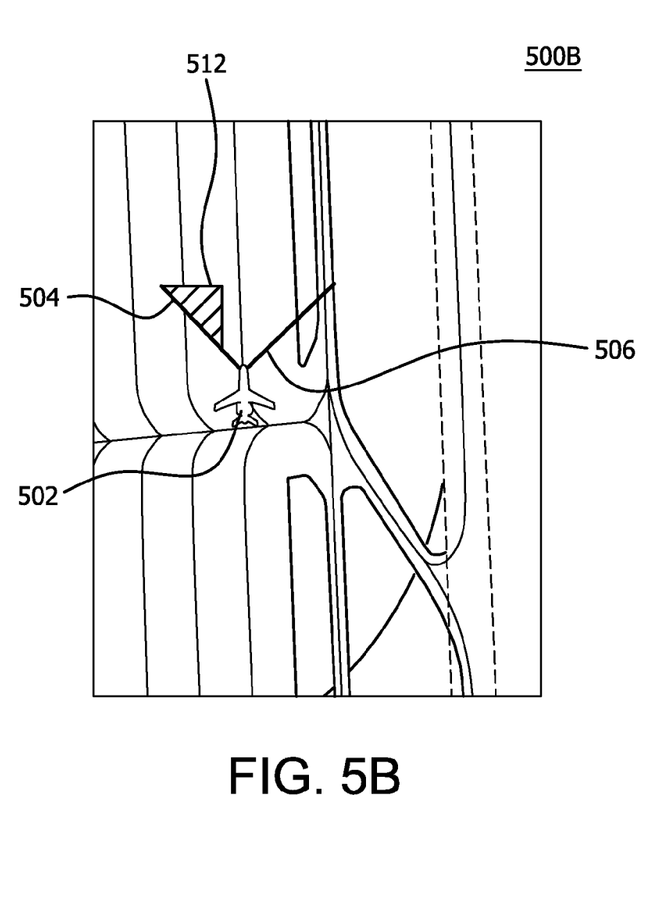
FIG. 5B illustrates, in accordance with various embodiments, an example of an AMM displaying object data in two dimensions.

Such an AMM 500A and/or 500B is shown with respect to FIGS. 5A and 5B. As depicted, an aircraft icon 502 can be displayed by the AMM 500A and/or 500B. Two radially extending indices 504 and 506 can be displayed, each, in various embodiments, terminating in and joined by an arc, the area enclosed within defining a sector. However, in various embodiments, and as shown, an arc can be excluded. One or more objects 508 and/or 510 can be indicated by the AMM 500A and/or 500B and an area or areas, such as areas 512 and/or 514 can be displayed or otherwise indicated by the AMM 500A and/or 500B. These areas 512 and/or 514 can indicate an area about the objects 508 and/or 510 that may be obscured from a field of view of a pilot. Moreover, the areas 512 and/or 514 can be indicated in any suitable manner. For instance, the areas 512 and/or 514 can be shaded, highlighted, and the like. Thus, a pilot can, as disclosed herein, receive a visual alert that a first displayed object may obscure a second (non-displayed) object situated about (e.g., behind, from the perspective of the pilot) the first object.

Figure 6:
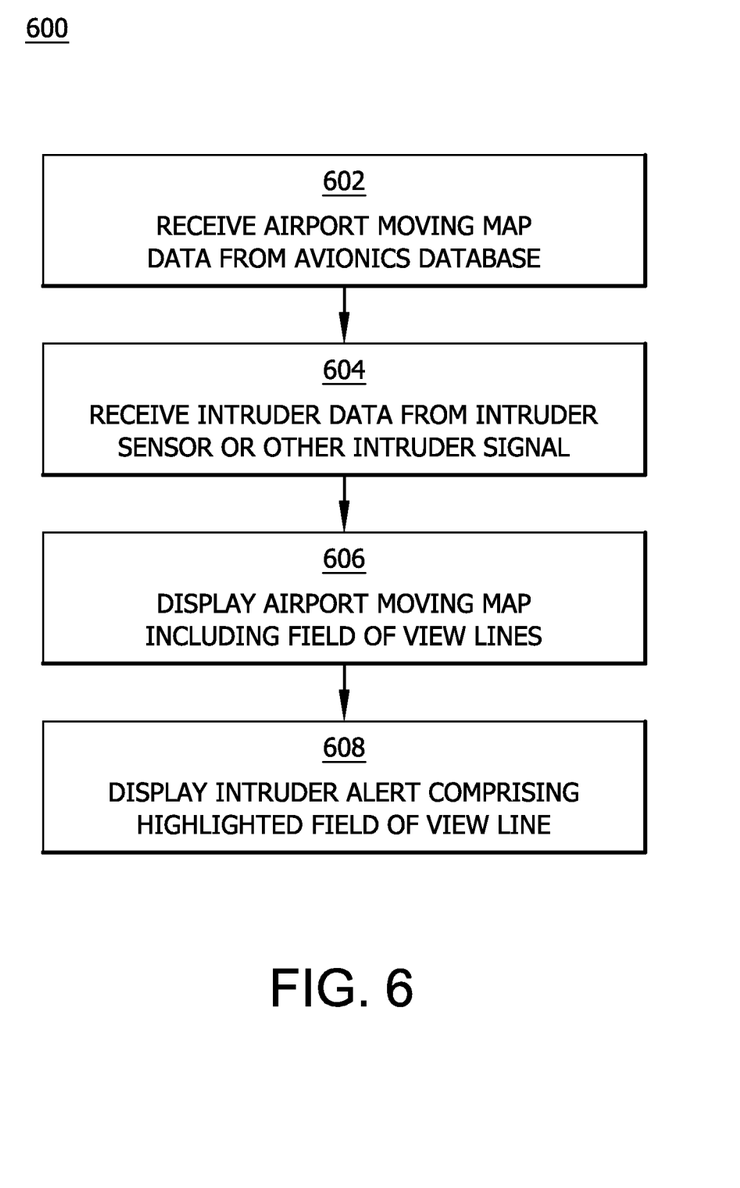
FIG. 6 illustrates, in accordance with various embodiments, a process for displaying an intruder notification within an AMM.

Now, in the instance that an AMM may not display, as described above, an indication that a vehicle, such as an aircraft or other oncoming vehicle (or "intruder") is approaching, FIG. 6 shows an example process 600, associated with various embodiments, for alerting a pilot to such an intruder. In various embodiments, the FMS 104 can receive an AMM and/or AMM data from an avionics database 102 (step 602). The FMS 104 can, in addition, receive intruder data associated with an oncoming or surrounding vehicle from a sensor and/or any other signal or indicator transmitted and/or received by the FMS 104 (step 604). The AMM can include a field of view of the pilot (step 606). In addition, the AMM can include or display an intruder alert (step 608). The intruder alert can comprise any suitable indicator that an intruder is encroaching. For instance, an intruder alert can comprise a highlighted, dotted, striped, or otherwise demarcated field of view, line, lines, indices, radially extending indices, and the like. The FMS 104 can, in response to receiving an indication that an intruder is encroaching, process the intruder data to generate and/or supplement the AMM with the intruder alert.

Figure 7A:
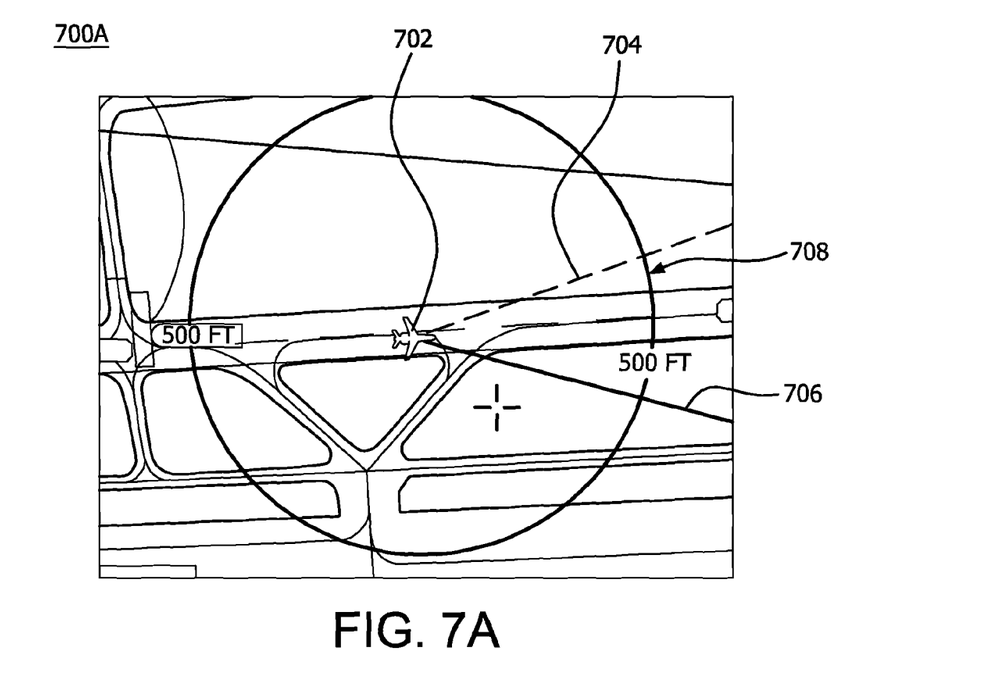
FIG. 7A illustrates, in accordance with various embodiments, an example of an AMM displaying an approaching vehicle notification in two dimensions.
Figure 7B:
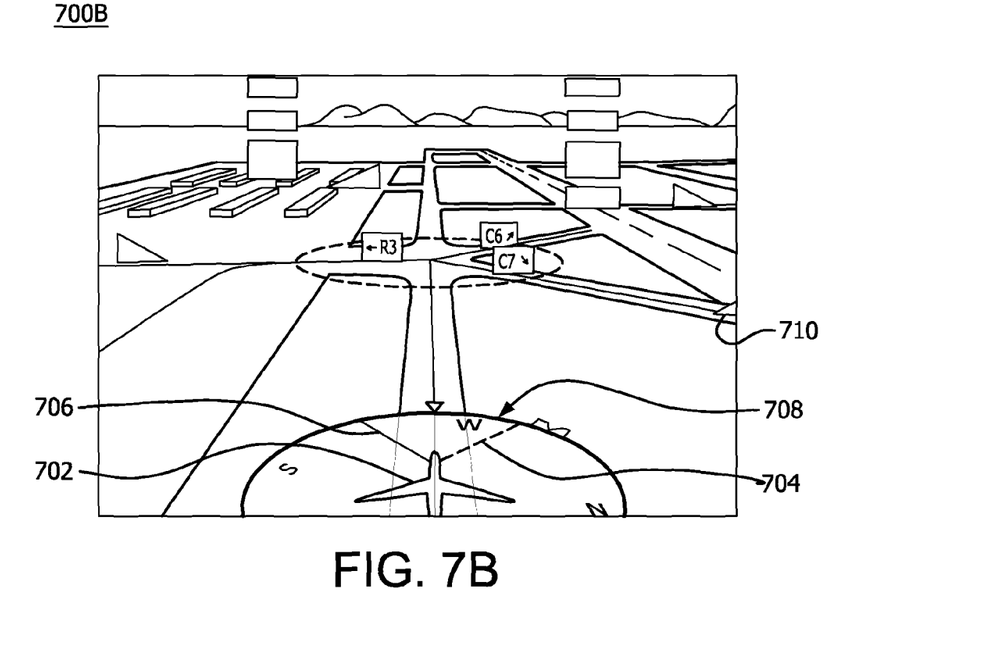
FIG. 7B illustrates, in accordance with various embodiments, an example of an AMM displaying an approaching vehicle notification in three dimensions.

Such an AMM 700A and/or 700B is shown with respect to FIGS. 7A and 7B. As depicted, an aircraft icon 702 can be displayed by the AMM 700A and/or 700B. Two radially extending indices 704 and 706 can be displayed, each, in various embodiments, terminating in and joined by an arc 708, the area enclosed within defining a sector. However, in various embodiments, and as shown, the arc 708 can be excluded.

Accordingly, the AMM 700A and/or 700B can include, as shown, one or more radially extending indices 704 and/or 706, each highlighted, as shown for example with respect to index 704, to indicate an intruder 710 that may be encroaching or approaching the aircraft 702 but that is outside the actual field of the pilot of the aircraft. Thus, the system 100 can display one or more intruder alerts based upon data associated with intruder position(s), location(s), and/or any other intruder data that are or may be outside of a field of view of a pilot.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying object data within an airport moving map ("AMM"), the system comprising:
    an avionics database;
    a flight management system (FMS) comprising a processor communicatively coupled to the avionics database and to a storage medium comprising an algorithm embodied in a software module; and a display communicatively coupled to the processor, wherein the processor is configured to:
   receive AMM data from the avionics database,
   receive object data from the avionics database,
   read and execute the algorithm to process the AMM data and the object data, and
   display the AMM overlaid with (i) radially extending indices that indicate a field of view of a pilot, (ii) an image of the object, and (iii) a visually distinguishable area extending behind the object toward an index of the field of view, the area having a shape indicating the area within the field of view that may be obscured by the object.

2. The system of claim 1, wherein the processor receives data from the avionics database about the field of view of the pilot, as illuminated by at least one external illumination element.

3. The system of claim 1, wherein the processor determines the field of view of a pilot based upon an intensity of at least one external illumination element.

4. The system of claim 1, wherein the radially extending indices comprise a first radial index, a second radial index, and wherein the processor is configured to display on the AMM the field of view comprising a first radial index, a second radial index, and an arc that joins the first and second radial indices.

5. The system of claim 1, the AMM further displaying an intruder alert comprising an icon representing the intruder.

6. The system of claim 5, wherein the intruder alert further comprises a radially extending index.

7. A method for displaying object data within an airport moving map ("AMM"), the method comprising:
   displaying, by a display communicatively coupled to a flight management system comprising a processor, the AMM;
   receiving AMM data from an avionics database;
   receiving object data;
   executing an algorithm stored as a software module in a storage medium to:
      process the object data and the AMM to generate an area that may be obscured by the object; and
      display the AMM overlaid with (i) radially extending indices that indicate a field of view of a pilot, (ii) an image of the object, and (iii) a visually distinguishable area extending behind the object toward an index of the field of view, the area having a shape indicating an area within the field of view that may be obscured by the object.

8. The method of claim 7, wherein the processor receives data from the avionics database about the field of view of the pilot, as illuminated by at least one external illumination element.

9. The method of claim 7, wherein the processor determines the field of view of a pilot based upon an intensity of at least one external illumination element.

10. The method of claim 7 wherein the radially extending indices comprise a first radial index and a second radial index, and further comprising displaying the first radial index, the second radial index, and an arc that joins the first and second radial indices.

11. The method of claim 7, the AMM further displaying an intruder alert comprising an icon representing the intruder.

12. The method of claim 11, wherein the intruder alert further comprises a radially extending index.

13. A system for displaying intruder data within an airport moving map ("AMM"), the system comprising:
   an avionics database;
   a flight management system (FMS) comprising a processor communicatively coupled to the avionics database and to a storage medium comprising an algorithm embodied in a software module;
   and
   a display communicatively coupled to the processor, wherein the processor is configured to:
      receive AMM data from the avionics database,
      receive object data from the avionics database,
      receive intruder data, and
      read and execute the algorithm to process the AMM data, the object data, and the intruder data to
   display the AMM overlaid with (i) radially extending indices that indicate a field of view of a pilot, (ii) an indication of the intruder, (iii) an icon representing the intruder, the intruder comprising a ground based vehicle that is within a radial distance of an aircraft that is displaying the AMM, (iv) an image of the object, and (v) a visually distinguishable area extending behind the object toward an index of the field of view, the area having a shape indicating an area within the field of view that may be obscured by the object.

14. The system of claim 13, wherein the processor receives data from the avionics database about the field of view of the pilot, as illuminated by at least one external illumination element.

15. The system of claim 13, wherein the processor determines the field of view of the pilot based upon an intensity of at least one external illumination element.

16. The system of claim 13, wherein radially extending indices comprise a first radial index and a second radial index, and wherein the processor is configured to display on the AMM the pilot field of view comprising the first radial index, the second radial index, and an arc that joins the first and second radial indices.

* * * * *